May 15, 1945.  T. L. PAGE  2,376,002
CUTTER FOR SPROUTS OR TREE SUCKERS
Filed March 15, 1944
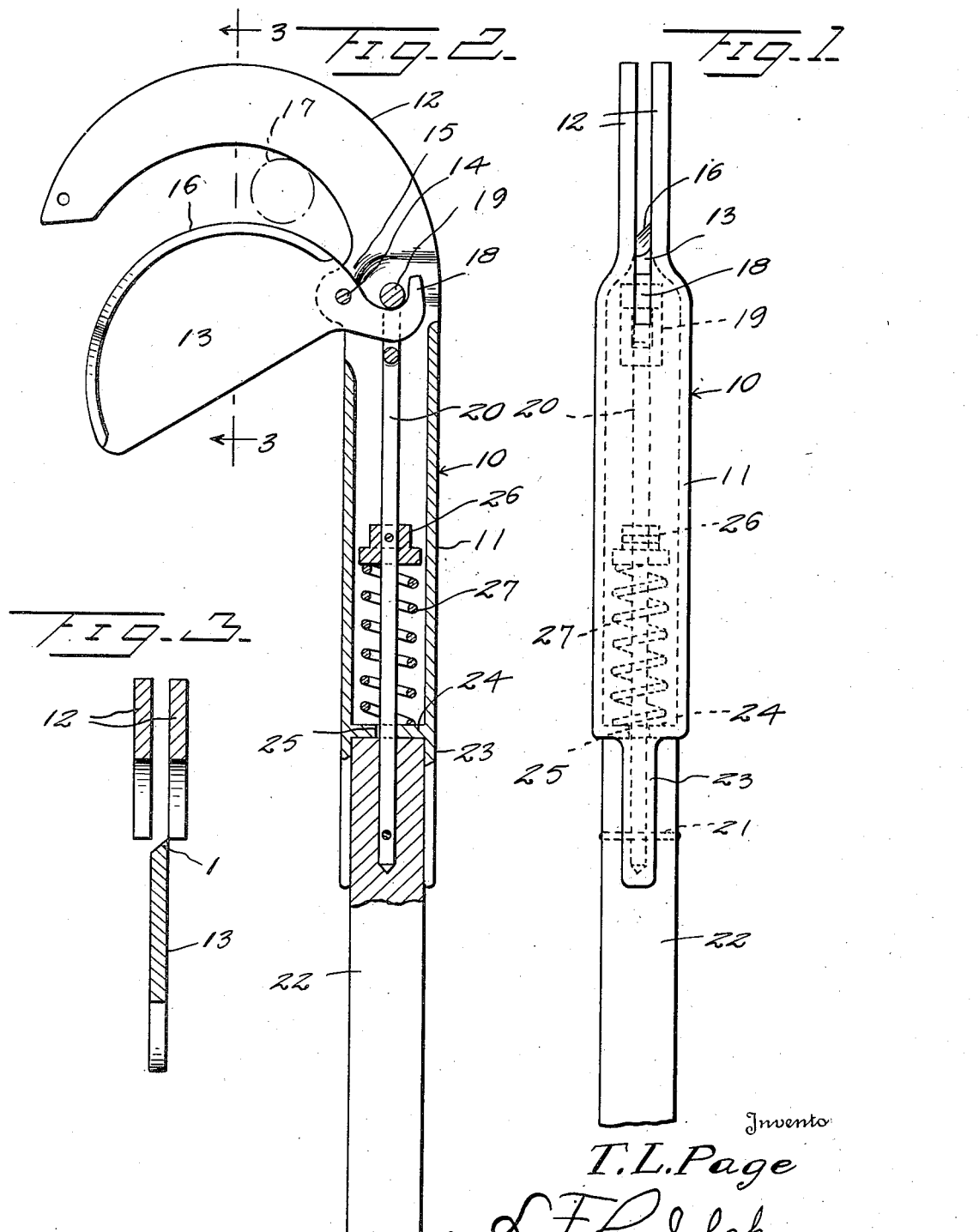
Inventor
T. L. Page
By L. F. Rudolph
Attorney Patented May 15, 1945

2,376,002

UNITED STATES PATENT OFFICE 2,376,002

CUTTER FOR SPROUTS OR TREE SUCKERS

Thomas L. Page, Stamford, Conn.

Application March 15, 1944, Serial No. 526,586

2 Claims. (Cl. 30—246)

This invention relates to a cutter for tree suckers, sprouts, and the like.

It is primarily aimed to provide a construction which is operable by one hand to add to safety of operation where the operator works on a ladder, a tree, or otherwise off the ground, since it leaves one hand free to grasp the ladder, branch, or tree.

A further object is to provide such a construction as is well adapted for use in the orchard and in tree surgery.

Additionally, it is aimed to provide a simple, durable and relatively inexpensive structure.

The more specific objects and advantages will be inferred from the description following taken in connection with accompanying drawing illustrating an operative embodiment.

In said drawing:

Figure 1 is a view of the cutter looking toward one side edge thereof;

Figure 2 is a view of the cutter taken at a right angle to Figure 1, with parts in section to disclose details; and Figure 3 is a detail section taken on the line 3—3 of Figure 2.

Referring specifically to the drawing wherein the same reference characters designate the same parts, 10 designates a slidable head for instance, having a tube at 11 open at the top and from which top extends a pair of hooks or jaws 12, which are relatively close together, so that a cutter in the form of a plate 13 may be moved relatively thereto and therebetween, such cutter being pivoted at 14 to lugs 15 integral with the hooks 12. Said cutter also has a convex edge which is sharpened as at 16 to enable engagement of the hooks and cutter with a sprout, sucker, branch, or the like, as suggested in dotted lines at 17.

Said cutter 13 has a hook at 18 which is disposed at the open end of the tube 10 and engaged in an eyelet 19 of a rod 20 which is attached by a pin 21 to an actuating handle 22 of any desired length.

Said handle 22 is slidably disposed between and guided by arms 23 depending from the tube 11 and particularly a web 24 therein, which is engaged with the upper end of the handle 22. Rod 20 slides freely through an opening 25 in said web 24 and at a distance above the web, a suitable abutment 26 is fastened to the rod. Surrounding the rod and engaging the web 24 and abutment 26 at opposite ends is an expansive coil spring 27 which maintains the parts normally as shown in Figure 2, that is, with the cutter in open position.

In operation, the tool is held with one hand grasping the handle 22. The other hand is thus free for engagement with the ladder, limb of a tree or the like for safety purposes. Since the cutter 13 is normally open, the structure may be readily operatively applied to a sucker, sprout, branch, or the like as suggested in Figure 2. When thus engaged, the object 17 will form an abutment for the hook 12 and hence when the handle is pulled downwardly by the hand engaged therewith, the handle and rod 20 will move relatively to the tube 11, causing eyelet 19 and hook 18 to swing the cutter 13 across the object 17, toward the hooks 12 and between the same. During such action, spring 27 will be compressed so that upon completion of a cutting operation, the spring 27 will expand and restore the cutter to the open position of Figure 2.

Various changes may be resorted to provided they fall within the spirit and scope of the invention.

I claim as my invention:

1. A cutting implement of the class described having a body provided with a tube, a hook extending from the tube, a cutter pivoted to the body and movable relatively to the hook, a handle slidable relatively to the body, an operative connection through the tube between the handle and cutter, an expansive spring means coacting with said connection to urge the cutter to open position, said tube having a perforated web adjacent its lower end, and said connection including a rod slidable through the perforation of web.

2. A cutting implement of the class described having a body provided with a tube, a hook extending from the tube, a cutter pivoted to the body and movable relatively to the hook, a handle slidable relatively to the body, an operative connection through the tube between the handle and cutter, an expansive spring means coacting with said connection to urge the cutter to open position, said tube having a perforated web adjacent its lower end, said connection including a rod slidable through the perforation of web, a hook and eyelet connection between the cutter and said rod, and guide means for the handle depending from said web.

THOMAS L. PAGE.